United States Patent
Lee et al.

(10) Patent No.: US 6,819,220 B1
(45) Date of Patent: Nov. 16, 2004

(54) APPARATUS AND METHOD FOR EXCHANGING MESSAGE BETWEEN PORTABLE DEVICES OF THE SAME KIND

(75) Inventors: Myun W. Lee, Seoul (KR); Won I. Lee, Seoul (KR); Chang K. Cho, Kyunggi-do (KR); Jung K. Kim, Seoul (KR)

(73) Assignee: Myun Woo Lee, Seoul (KR)

( * ) Notice: Subject to any disclaimer, the term of this patent is extended or adjusted under 35 U.S.C. 154(b) by 0 days.

(21) Appl. No.: 09/601,420

(22) PCT Filed: Feb. 2, 1999

(86) PCT No.: PCT/KR99/00052

§ 371 (c)(1),
(2), (4) Date: Aug. 1, 2000

(87) PCT Pub. No.: WO99/39522

PCT Pub. Date: Aug. 5, 1999

(30) Foreign Application Priority Data

Feb. 2, 1998 (KR) .............................................. 98-2841

(51) Int. Cl.⁷ ............................. H04Q 7/00; H04B 7/00; G08B 23/00; H04M 3/51
(52) U.S. Cl. ...................... 340/7.1; 340/7.51; 340/7.52; 340/573.1; 455/41.2
(58) Field of Search ................................ 340/7.1, 5.63, 340/7.51, 825.49, 7.52, 10.1, 573.1; 455/41.1, 558, 41.2; 463/40, 49, 42

(56) References Cited

U.S. PATENT DOCUMENTS 5,455,575 A * 10/1995 Schuermann ................ 342/42
5,521,589 A * 5/1996 Mondrosch et al. ........ 340/7.51
5,618,045 A * 4/1997 Kagan et al. ................. 463/40
5,666,661 A * 9/1997 Grube et al. ................ 455/509
5,909,183 A * 6/1999 Borgstahl et al. ....... 340/825.22
5,955,962 A * 9/1999 Matsuura .................... 340/7.1
5,995,500 A * 11/1999 Ma et al. .................... 455/524
6,097,278 A * 8/2000 Arnold et al. ............. 340/10.1

FOREIGN PATENT DOCUMENTS

| EP | 639018 A2 | * 2/1995 | ............ H04M/3/50 |
|---|---|---|---|
| KR | 9900052 | 2/1999 | |

* cited by examiner

Primary Examiner—Brian Zimmerman
Assistant Examiner—Clara Young
(74) Attorney, Agent, or Firm—Piper Rudnick LLP

(57) ABSTRACT

The present invention relates generally to a method and apparatus capable of transmitting/receiving a message between persons carrying devices of the same kind, together with a desired reproduction time of the message, when the devices are connected to or come close to each other. The message exchanging method according to the present invention comprises the steps of storing a message and its desired reproduction time; checking whether an outer device is the device of the same kind based on a signal from the outer device; transmitting the message and its reproduction time to the outer device according to the check result; and reproducing the message in the outer device at the reserved time for reproduction of the message. According to the present invention, it is possible to let persons who carry portable device of the same kind for exchanging private messages listen to the messages at the desired time, which is set by the person at the transmission side.

5 Claims, 4 Drawing Sheets

APPARATUS AND METHOD FOR EXCHANGING MESSAGE BETWEEN PORTABLE DEVICES OF THE SAME KIND

TECHNICAL FIELD

The present invention relates generally to a method and apparatus for message exchange, and more particularly, to a method and apparatus capable of transmitting/receiving a message between persons carrying devices of the same kind, together with a desired reproduction time of the message, when persons carrying the devices come close to each other or the devices are connected to each other, and detecting partner's presence when a partner carrying the counterpart device comes within a predetermined distance.

BACKGROUND ART

Conventionally, terminal devices of public communication networks such as telephone, pager, and personal computer have been in use to deliver messages to persons who are distant from each other. In addition to inconvenience, time and cost are needed to send and receive messages over public networks. Moreover, in the message transmission over the public networks, the time when a message is delivered to the reception side is totally determined by the caller at the transmission side. Hence, a message may not be delivered to persons at the reception side for several reasons such as the person's absence.

Answering machine or voice mailing system have been developed and used to store messages which otherwise would not be listened to by the person at the reception side. However, retrieving and listening to the delivered message requires for the person to operate such apparatuses. In other words, it is rare that the person at the reception side gets and listens to the message at the very time that the caller wants the person to listen to the message. Message transmission through such terminals over the public networks is net satisfactory to persons who wish to become in intimate relationship with each other by exchanging private messages s and letting the partner to listen to the messages at a treated time.

DISCLOSURE OF INVENTION

It is therefore a primary object of the present invention to provide a method and apparatus capable of transmitting/receiving a message between persons carrying devices of the same kind, together with its desired reproduction time, when the devices are connected or come close to each other, thereby the exchanged message being reproduced automatically at the desired time.

It is another object of the present invention to provide a method and apparatus which enables to inform the presence of a partner carrying a device of the same kind, which is designated as the counterpart device, when the partner comes within a predetermined distance.

To achieve the objects, the present invention provides an apparatus for exchanging messages between portable devices of the same kind, comprising receiving means for receiving a signal containing a message; input means for entering a desired reserved time to reproduce the message; a memory for storing the message and the reproduction time thereof; connection means for connecting to another device; transmitting means for transmitting the message and its reproduction time stored in the memory.

The apparatus for exchanging message between portable devices of the same kind according to the present invention comprises connecting means for connecting to another device; receiving means for receiving data through the connection means; a memory for storing the received data; a clock unit for counting the present date and time; determining means for determining whether or not the reproduction time of the received data corresponds to the present time; and reproduction means for reproducing the received message according to the determination result.

The method of exchanging message between portable devices of the same kind according to the present invention is characterized in that, in a reception mode, it comprises the steps of examining whether an outer device is the device of the same kind based on a signal received from the device; receiving message and its corresponding reproduction time which are included in the data from the outer device; storing the received message and its reproduction time; checking continuously whether the reproduction time of the message corresponds to the present time; and reproducing the message when they corresponds to each other.

The method of exchanging message between portable devices of the same kind according to the present invention is also characterized in that, in a transmission mode, it comprises the steps of storing a message to be transmitted, together with a desired reproduction time; examining whether an outer device is the device of the same kind based on a signal received from the outer device; and transmitting the message and its reproduction time to the device when it is determined that hey are devices of the same kind.

The method of exchanging message between portable devices of the same kind according to the present invention is further characterized in that it comprises the steps of receiving a signal from an outer device within a signal reception range; confirming whether or not the device is the device of the same kind which is designated as the counterpart device, i.e., the device which is in one-to-one communication correspondence on the basis of the received signal; and generating a sound when the outer device is identified as the counterpart.

In the method and apparatus for exchanging message between portable devices of the same kind according to the present invention, a user inputs a message that he or she wants to send and then enters a desired reproduction time of the message through the input means. The message and its corresponding reproduction time are stored in the memory.

At the state where a message is stored, when the connection means is connected to or gets close to that of another device of the same kind within a signal reception range of the connection means, the transmitting means transmits the message to the reception side device, along with the associated reproduction time.

On the other hand, the reception side device receives the message from the transmission side device and then stores the message in the memory. Then, the determining means keeps checking whether or not the present time which is counted by the clock unit corresponds to the reproduction time of the message.

The message in the memory begins to be reproduced by the reproduction means when the present time becomes equal to the reserved reproduction time, allowing the person carrying the device to listen to the message at an unexpected time.

According to the present invention, it is possible to let persons who carry portable devices of the same kind listen) to a private message at a desired reproduction time which is set by the person at the transmission side, by automatically exchanging the message and the desired reproduction time thereof when the persons come close to each other. The present invention, therefore, may help persons who want to become intimate with each other, develop friendship or love, and increase their pleasure of meeting each other.

BRIEF DESCRIPTION OF DRAWINGS

The accompanying drawings, which are included to provide a further understanding of the invention, illustrate a preferred embodiment of this invention, and together with the description serve to explain the principles of the present invention.

In the drawings.

MODES FOR CARRYING OUT THE INVENTION

The preferred embodiments of the present invention will be described below in detail referring to the accompanying drawings.

Figure 1:
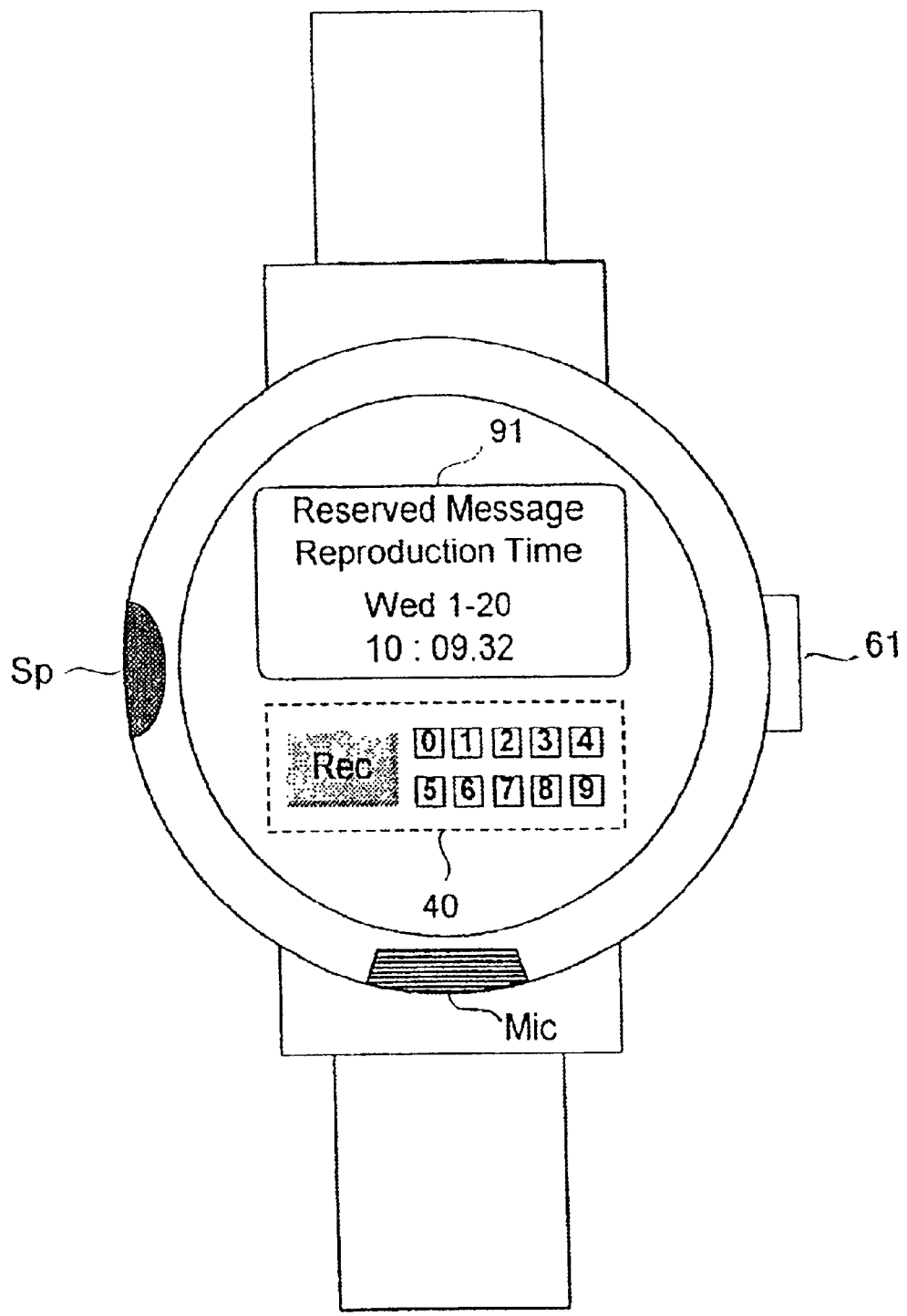
FIG. 1 is a schematic diagram showing an appearance of a wrist watch embodying the message exchanging apparatus of the present invention.
Figure 2:
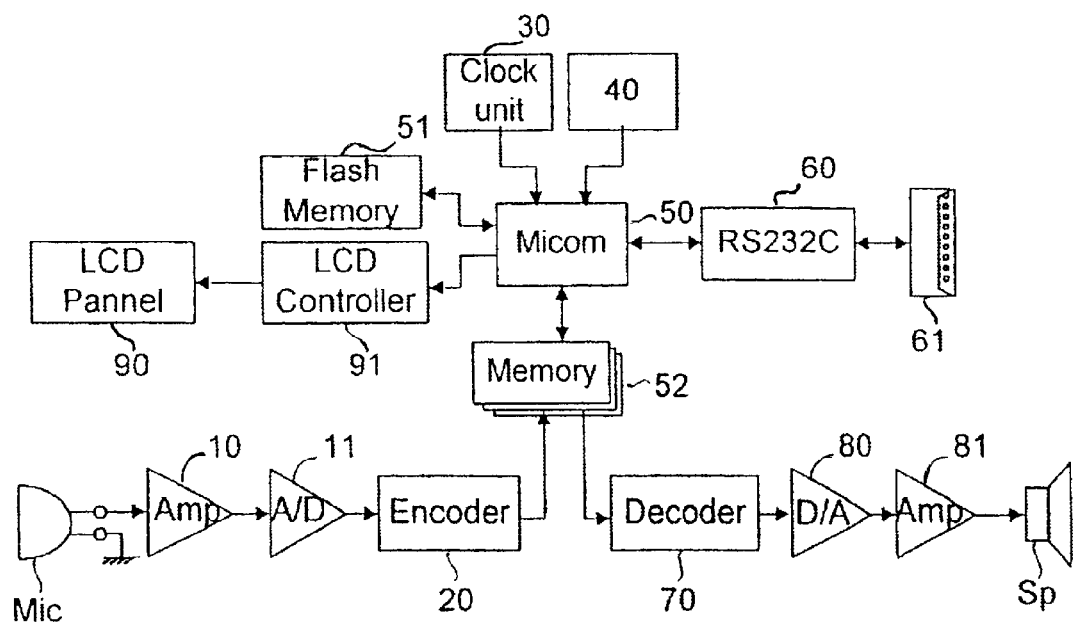
FIG. 2 is a schematic diagram showing a preferred embodiment of the message exchanging apparatus of the present invention.

FIG. 1 depicts an appearance of a wrist watch embodying the apparatus of the present invention, and a preferred embodiment of the apparatus for message exchange between portable devices of the same kind (here, the wrist watch of FIG. 1) is shown in FIG. 2. The preferred embodiment of FIG. 2 comprises an amplifier 10 for amplifying a voice signal received through a microphone Mic; an A/D converter 11 for digitizing the amplified signal; an encoder 20 for compressing and encoding the digitized signal; a clock unit 30 for counting the present time; a liquid crystal device (LCD) 90 for displaying digital data; LCD control unit 91 for converting digital data to signal fitted for the LCD 90; a key pad 40 for entering a user's input; a memory 52 for storing the encoded voice data and the reproduction time thereof; a flash memory 51 for storing identification(ID) codes of the portable device and the counterpart device; a connector 61; an RS232C 60 for serial communication through the connector 61; a decoder 70 for decoding the encoded voice data; a D/A converter 73 for converting the voice data into analog signal; a driving amplifier 81 for amplifying and applying the analog signal to a speaker; and a MICOM (micro-computer) 50 for overall control of the above-described elements.

Figure 4:
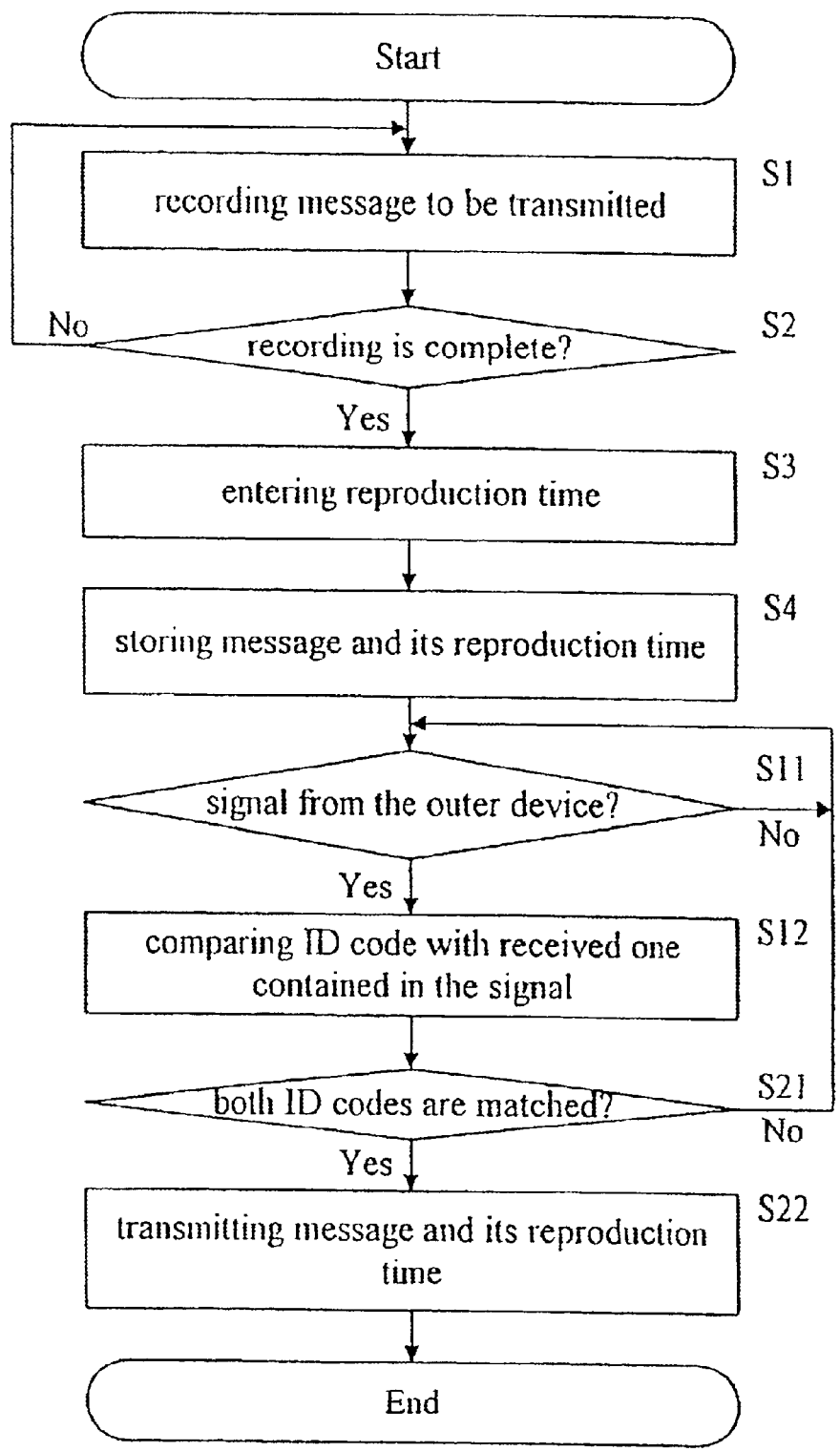
FIGS. 4 and 5 are flow charts respectively depicting the methods of message transmission and message reception according to the present invention.
Figure 5:
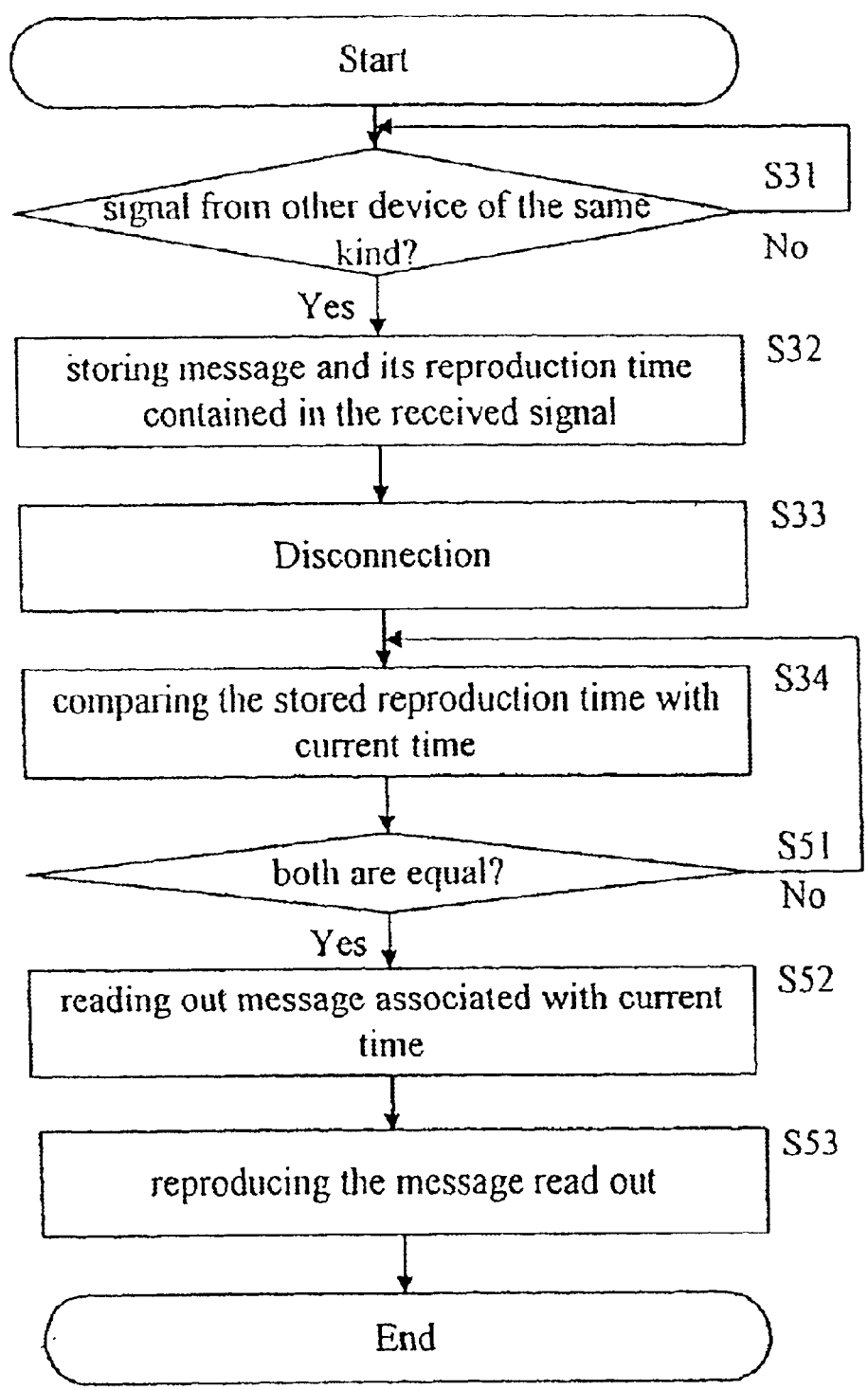

With reference to flow charts of FIGS. 4 and 5, the embodiment of the present invention shown in FIG. 1 will be described below in detail.

In the embodiment of FIG. 1, first, a user presses REC button on the key pad 40 and starts to record a voice message through the Mic (S1). Upon the recording is completed, the user presses the REC button again to inform the MICOM 50 of recording completion (S2). The voice signal is amplified by the amplifier 10 to a predetermined level, digitized by the A/D converter 11, and fed to the encoder 20. The digital data compressed and encoded by the encoder 20 is stored in the memory 53. After the recording, the play time information (including "day/month/year" information) of the recorded voice message is entered through the key pad 40 (S3), and then is stored in the memory 52, with linkage information to the recorded voice message (S4). Meanwhile, the present time which is counted by the clock unit 30 is displayed on the LCD 90.

When at least one voice message is kept in the memory 52, if the connector 61 is connected to the that of another device of the same kind, a level change (from floated high to low) of a particular pin due to the connection to the device occurs in the RS232C 60 and then is used to inform the MICOM 50 of an establishment of the connection. Then, while reading out its own ID code from the flash memory 51 and sending the ID code to the connected device, the MICOM 50 receives a signal from the connected device through the RS232C 60 (S11). A comparison is made as to whether or not the ID code in the received signal is matched with that of the device, which is designated as the counterpart to the device receiving the signal, in the flash memory 51 (S12).

When it is determined that both ID codes are matched (S21), if any, the MICOM 50 sends all of the voice message in the memory 52 to the counterpart device through the RS232C 60 and the connector 61, along with the associated reproduction time information (S22). As a result, the message exchanging apparatus installed in the counterpart device receives the messages and, in turn, sends messages stored in its memory, if any, through the same routine of S1 to S22. This way, messages and their reproduction time information are exchanged between the two corresponding portable devices.

Upon receiving the voice message and its reproduction time information from the counterpart device through the connector 61 and the RS232C 60. (S31), the MICOM 50 stores them in the memory 52 (S32). Then, the connection established between the two devices is disconnected (S33), and at the same time, the MICOM 50 starts to compare the present time which is counted by the clock unit 30 with the reproduction time of the message in the memory 52 (S34). (In case where the reproduction time of the received message is equal to the time when the message is received over the connection, the subsequent operations for reproduction of the message are performed, with the connection established.) When it is determined that the present time is equal to the reproduction time (S51), the voice message is read out from the memory 52 (S52) and is sent to the decoder 70 under control of the MICOM 50. The voice signal decompressed and decoded by the decoder 70 is supplied to the D/A converter 80.

The analog signal from the D/A converter 80 is inputted to the speaker through the driving amplifier 81 (S53). As a result, persons carrying the portable device which is equipped with the apparatus of the present invention listen to the voice message that is received from the partner, at a desired specific time.

Figure 3:
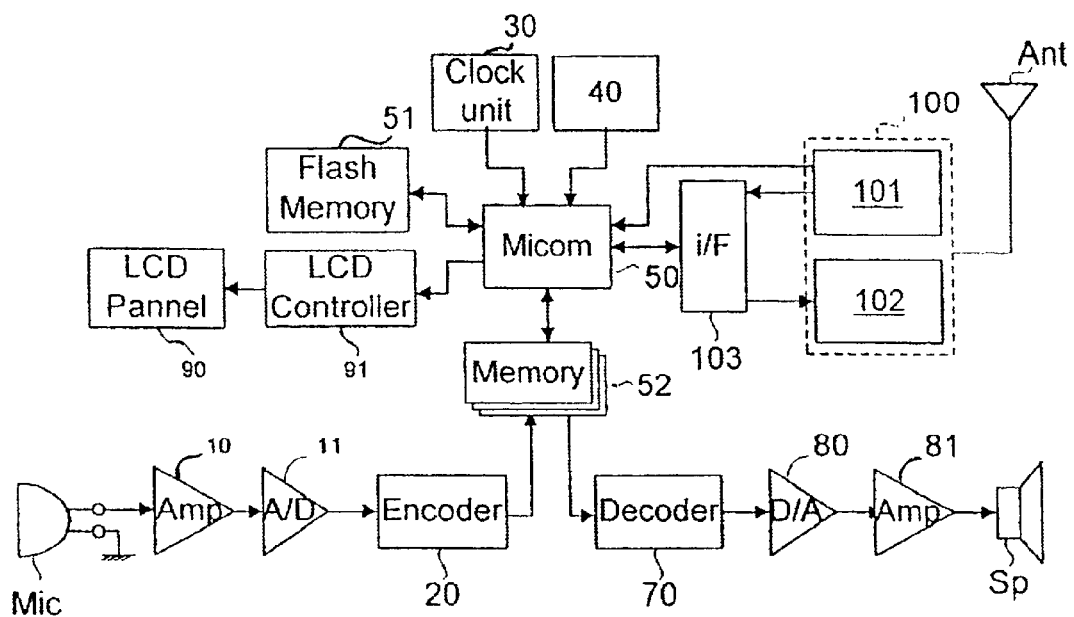
FIG. 3 is a schematic diagram showing another preferred embodiment of the message exchanging apparatus of the present invention.

FIG. 3 shows another embodiment of the message exchanging apparatus according to the present invention. This embodiment differs from the foregoing embodiment of FIG. 2 in that, instead of the connector 61 and the RS232C 60, an RF communication unit 100 (RF receiver 101 and RE transmitter 102) and an interface (I/F) unit 103 are used for wireless communication through an antenna, and that a sound is additionally stored in the flash memory 51.

The embodiment of FIG. 3 will be described below in detail with reference to the flow charts of FIGS. 4 and 5.

In the embodiment of FIG. 3, the voice message and its corresponding reproduction time are stored in the memory 52 through the same routine of S1 to S4 as that of the foregoing embodiment.

Unlike the foregoing embodiment of FIG. 2, in the embodiment of FIG. 3, the RF transmitter 102 broadcasts an RF signal containing its own ID code in the flash memory 51 at a transmission power level, so that devices-of the same kind, which is equipped with the apparatus of the present invention, within about 100 meters can detect the RF signal. Such high transmission power enables the other device to detect the presence of a device, of the same kind which is designated as the counterpart device within rather a long distance.

While broadcasting the RF signal containing the ID code, if a device of the same kind is present within a distance of about 100 meters, the RF receiver 101 receives an RF signal broadcast from the other device. Then, a comparison is made by the MICOM 50 as to whether or not the ID code of the counterpart device kept in the flash memory is matched with the ID code contained in the received RF signal. If they are matched, the MICOM 50 sends the sound data in the flash memory 51 to the decoder 70. The decoded sound data is supplied to the speaker through the D/A converter 80 and the driving amplifier 81, letting persons carrying the device of the present invention know that they are close to each other.

As the two devices which are in one-to-one correspondence with each other get closer, the power of signal induced in the RF receiver 101 increases. When the distance between them becomes equal to a predetermined value, say, 30 cm, the MICOM 50 become aware of the presence of the counterpart device within a range of 30 cm through the RF receiver 101 and the I/F unit 103.

If a signal is detected in the RF receiver, power of which is greater than a predetermined level (a power level that can be detected within a distance of 30 cm at a preset transmission power), the RF receiver 101 demodulates the detected signal (S11). The demodulated signal is converted to digital data by the I/F unit 103 and then the data is sent to the MICOM 50.

The MICOM 50 makes a comparison as to whether or not the ID code contained in the data is matched with the ID code of the counterpart device in the flash memory 51 (S12). When it is determined that both ID codes are matched (S21), the voice message in the memory 52 and its reproduction time information are, if any, fed to the I/F unit 103, in which they are converted to a serial data. Then, the serial data is supplied to the RF transmitter 103, in which they are modulated into an RF signal so that the resulting RF signal is broadcast through the antenna at a predetermined transmission power (a power level that can be detected within a range of 30 cm) (S22) Accordingly, The counterpart device receives the message and its reproduction time information, and in turn sends, if any, its own message through the same routine of S11 to S22. In this way, messages and their reproduction time information are exchanged between the two corresponding portable devices through a wireless communication.

Once the reception of the voice message through the RF receiver 101 is completed (S31), the message is stored in the memory 52 by control of the MICOM 50, along with its reproduction time information (S32). The subsequent operations such as the time comparison (S34, S51) and reproduction of the voice message (S52, S53) are performed in the same way as those of the foregoing embodiment.

The foregoing is provided only for the purpose of illustration and explanation of the preferred embodiments of the present invention; therefore changes, variations and modifications may be made without departing from the spirit and scope of the invention.

What is claimed is:

1. An apparatus for exchanging messages between portable devices of the same kind, comprising:
   a means for inputting signal containing message;
   a means for entering a desired reproduction time of the message;
   a means for storing the inputted message and the entered reproduction time;
   a means for communicating data with another portable device;
   a means for checking for signals from another portable device and for checking, based upon receipt of a signal being transmitted from another portable device through said communicating means, whether or not said another portable device is a device of the same kind which is designated as the counterpart device for exchanging with each other;
   a means for generating a sound if said another portable device is identified as the counterpart device for exchanging with each other, and the level of the received signal exceeds a first level; and
   a means for transmitting data containing the message and its reproduction time stored in said storing means to said another portable device when said another portable device is identified as the counterpart device for exchanging with each other based upon the signal being received from said another device and the level of the signal being received from said another portable device exceeds a second level which is higher than the first level.

2. An apparatus according to claim 1, wherein the message is voice data.

3. An apparatus according to claim 1, further comprising:
   a means for broadcasting an RF signal containing its own ID code at a predetermined power level;
   a means for receiving data, through said communicating means, from another portable device identified as the counterpart device for exchanging with each other;
   a means for storing the received data;
   a means for providing present time;
   a means for checking whether or not a reproduction time of a message which is included in the received data corresponds to the present time; and
   a means for reproducing the message in the stored data, based on the check result.

4. A method for exchanging messages between portable devices of the same kind, comprising the steps of:
   storing a message and its reproduction time to be transmitted to other portable device;
   checking based upon receipt of a signal being transmitted from another portable device, whether or not said another portable device is a device of the same kind which is designated as the counterpart device for exchanging with each other;
   generating a sound if said another portable device is identified as the counterpart device for exchanging with each other, and the level of the received signal exceeds a first level; and
   transmitting the stored message and its reproduction time to said another portable device, when said another portable device is identified as the counterpart device for exchanging with each other based upon a signal being received from said another device and the level of the signal being received from said another portable device exceeds a second level which is higher than the first level.

5. A method according to claim 4, further comprising the steps of:
   broadcasting an RF signal containing its own ID code at a predetermined power level;
   receiving a message and its reproduction time from the portable device identified as the counterpart device for exchanging with each other;
   storing the received message and its reproduction time;
   checking whether or not the stored reproduction time corresponds to present time; and
   reproducing the stored message based on the check result.

* * * * *